United States Patent
Gheorghe et al.

(10) Patent No.: US 9,501,335 B2
(45) Date of Patent: *Nov. 22, 2016

(54) WEB SERVICE API FOR UNIFIED CONTACT STORE

(71) Applicant: MICROSOFT CORPORATION, Redmond, WA (US)

(72) Inventors: Bogdan Gheorghe, Seattle, WA (US); Alfred Kenneth S. Gopez, Bellevue, WA (US); Brendan C. Fields, Mercer Island, WA (US); Komal Kashiramka, Redmond, WA (US); Matthew C. Kuzior, Redmond, WA (US); Jucheng Xiao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,984

(22) Filed: Mar. 11, 2014

(65) Prior Publication Data

US 2014/0196060 A1    Jul. 10, 2014

Related U.S. Application Data

(63) Continuation of application No. 13/289,947, filed on Nov. 4, 2011, now Pat. No. 8,689,243.

(51) Int. Cl.
| | |
|---|---|
| *G06Q 10/10* | (2012.01) |
| *G06F 9/54* | (2006.01) |
| *H04L 12/58* | (2006.01) |

(52) U.S. Cl.
CPC ............. *G06F 9/541* (2013.01); *G06Q 10/10* (2013.01); *H04L 51/04* (2013.01); *H04L 51/28* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 6,973,299 | B2 | 12/2005 | Apfel |
| 7,337,448 | B1 * | 2/2008 | Dalia et al. ................... 719/328 |
| 7,797,293 | B2 | 9/2010 | Pabla et al. |
| 8,005,897 | B1 * | 8/2011 | Roka ..................... G06Q 10/10 709/205 |
| 2003/0065721 | A1 | 4/2003 | Roskind |

(Continued)

OTHER PUBLICATIONS

Avaya; "Instant Messaging Client Setup and Operation"; SCS 4.01; © 2010; accessed Aug. 5, 2011 at http://support.avaya.com/css/P8/documents/100122502; 61 pgs.
John C. Tang et al., "ConNexus to Awarenex: Extending awareness to mobile users," 2001.
Microsoft; "Instant Messaging when Group Chat and Office Communicator Run Together"; accessed Aug. 5, 2011 at http://office.microsoft.com/en-us/communicator-help/instant-messaging-when-group-chat-and-office-communicator-run-together-HA010335742.aspx; 1 pg.
Sun.com; "Instant Messaging 8 Quick Reference Guide"; accessed Aug. 5, 2011 at http://convergence.demo.sun.com:8080/im/en/imhelp/quickref.html; 9 pgs.

*Primary Examiner* — Andy Ho
*Assistant Examiner* — Abdou Seye
(74) *Attorney, Agent, or Firm* — Anand Gupta; Tom Wong; Micky Minhas (57) ABSTRACT

An Application Programming Interface (API) provides functions for interacting with contact lists and contacts that are stored in a unified contact store by a primary contact service. For example, a client of a unified communications service may use the API to access contact information that is stored with a primary contact service (e.g. a messaging application/service). The contact information is maintained by the primary contact service. The API includes functions such as, but not limited to: adding a new IM contact to a group, adding a new IM group, removing an IM contact from a group, adding a distribution group to an IM list, getting an IM item list, and tagging an IM contact. The contacts may be obtained from the primary contact service and temporarily stored by the client (e.g. within a cache) of a different service.

18 Claims, 4 Drawing Sheets

(56) References Cited

U.S. PATENT DOCUMENTS

| | | |
|---|---|---|
| 2007/0115991 A1 | 5/2007 | Ramani et al. |
| 2007/0168443 A1 | 7/2007 | Morgan |
| 2008/0263076 A1 | 10/2008 | Duffield et al. |
| 2010/0146065 A1 | 6/2010 | Zhu et al. |
| 2010/0287244 A1 | 11/2010 | Wicks et al. |
| 2010/0325222 A1 | 12/2010 | Taylor et al. |

\* cited by examiner

WEB SERVICE API FOR UNIFIED CONTACT STORE

CROSS REFERENCE TO RELATED APPLICATIONS

This application is a continuation of U.S. Pat. No. 8,689,243, filed Nov. 4, 2011, and entitled "Web Service API for Unified Contact Store," the disclosure of which is incorporated by reference herein in its entirety.

BACKGROUND

Many different types of services/programs use contacts for communication. For example, email programs may use email addresses; Instant Messaging (IM) programs may use buddy lists and IM contacts; phone programs may use telephone numbers; videoconferencing programs may use a variety of different contacts (e.g. IM, phone, email . . . ). Accessing and managing all of these different contacts and lists can be a complex task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An Application Programming Interface (API) provides functions for interacting with contact lists and contacts that are stored in a unified contact store by a primary contact service. For example, a client of a unified communications service may use the API to access contact information that is stored with a primary contact service (e.g. a messaging application/service). Instead of maintaining separate copies of common contact information at both the unified communications service and the primary contact, the contact information is maintained by the primary contact service. The API includes functions such as, but not limited to: adding a new IM contact to a group, adding a new IM group, removing an IM contact from a group, adding a distribution group to an IM list, getting an IM item list, and tagging an IM contact. The contacts may be obtained from the primary contact service and temporarily stored by the client (e.g. within a cache) of a different service.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
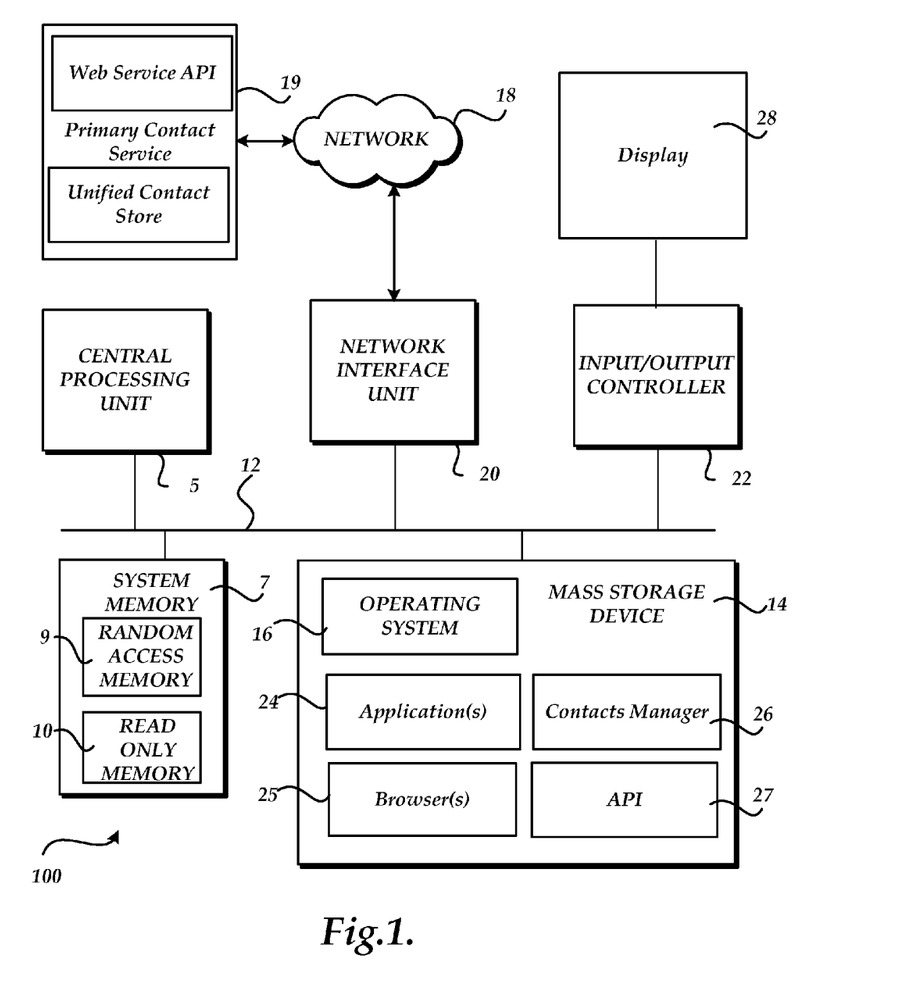
FIG. 1 illustrates an exemplary computing device.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, and other program modules, such as Web browser 25, API 27, and contacts manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as messaging application (e.g. MICROSOFT OUTLOOK), productivity applications, and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION.

Contacts manager 26 is configured to interact with contacts and lists that are associated with one or more applications. Contacts manager 26 may be a part of many different applications/services. For example, contacts manager 26 may be a part of a cloud based multi-tenant service that provides resources (e.g. services, data . . . ) to different tenants (e.g. MICROSOFT OFFICE 365). Contacts manager 26 may be a part of a primary contact service that 19 includes a unified contact store for at least the primary contact service and a different service. According to an embodiment, primary contact service 19 is MICROSOFT EXCHANGE and the different service is MICROSOFT LYNC 2010. An Application Programming Interface (API) 27 provides functions for interacting with contact lists and contacts that are stored in a unified contact store by a primary contact service. For example, a client of a unified communications service may use the API to access contact information that is stored with a primary contact service (e.g. a messaging application/service). Instead of maintaining separate copies of common contact information at both the unified communications service and the primary contact, the contact information is maintained by the primary contact service. The API includes functions such as, but not limited to: adding a new IM contact to a group, adding a new IM group, removing an IM contact from a group, adding a distribution group to an IM list, getting an IM item list, and tagging an IM contact. The contacts may be obtained from the primary contact service and temporarily stored by the client (e.g. within a cache) of a different service. Additional details regarding the operation of contacts manager 26 will be provided below.

Figure 2:
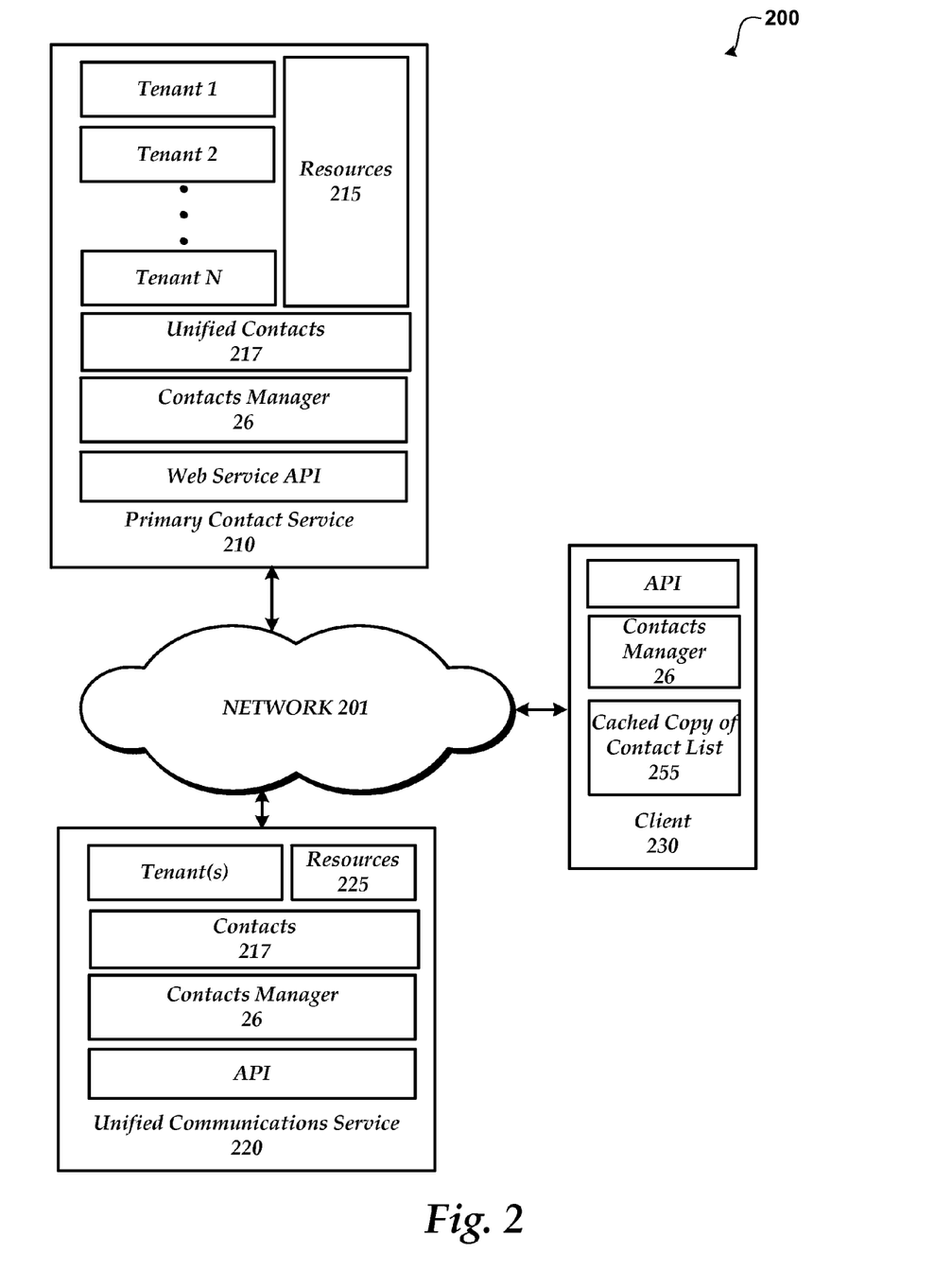
FIG. 2 illustrates an exemplary system using a web service API for interacting with a unified contact store.

FIG. 2 illustrates an exemplary system using a web service API for interacting with a unified contact store. As illustrated, system 200 includes service 210 including tenant 1-tenant N, unified communications service 220, network 201, and client 230. The illustration of system 200 is for explanatory purposes and is not intended to be limiting.

As illustrated, service 210 is a multi-tenant service that provides resources 215 and services to any number of tenants (e.g. Tenants 1-N). According to an embodiment, multi-tenant service 210 and unified communications service 220 are cloud based services that provides resources/services (215, 225) to tenants subscribed to the service and maintains each tenant's data separately and protected from other tenant data. For example, service 210 may be configured to provide services corresponding to messaging (e.g. MICROSOFT EXCHANGE) and unified communications service 220 may be configured to provide a unified communications environment (e.g. MICROSOFT LYNC 2010) that comprises video, IM, email, sharing, and the like. Both the primary contact service and the unified communications service interact with contacts, such as IM contacts and lists.

One or more contacts manager 26 may be included within the system. For example, a single contacts manager 26 may be utilized within service 210 and/or a contacts manager may be included at other locations (e.g. each tenant and user). The distributed contacts managers may be configured to interact with each other. For example, contacts manager 26 at unified communications service 220 may be configured to interact with the contacts manager on client 230 and primary contact service 210.

Primary contact service is configured to include a unified contacts store that stores contacts for one or more services/clients. Contacts/lists originally stored at a different service (e.g. contacts 217 at service 220) may be migrated to unified contacts 217 at primary contact service 210 such that service 220 may interact with the contacts/list using the web service APIs. According to an embodiment, once the contacts are migrated to the primary contact service, the contacts may be removed from the different service (e.g. service 220). When desired, copies may be obtained from primary contact service 210 and stored. For example, client 230 has requested through the API one or more lists and contacts to be stored within a cache (255). Providing a unified contact store that may be accessed by different clients/services assists in managing the common lists/contacts between the different services.

Figure 3:
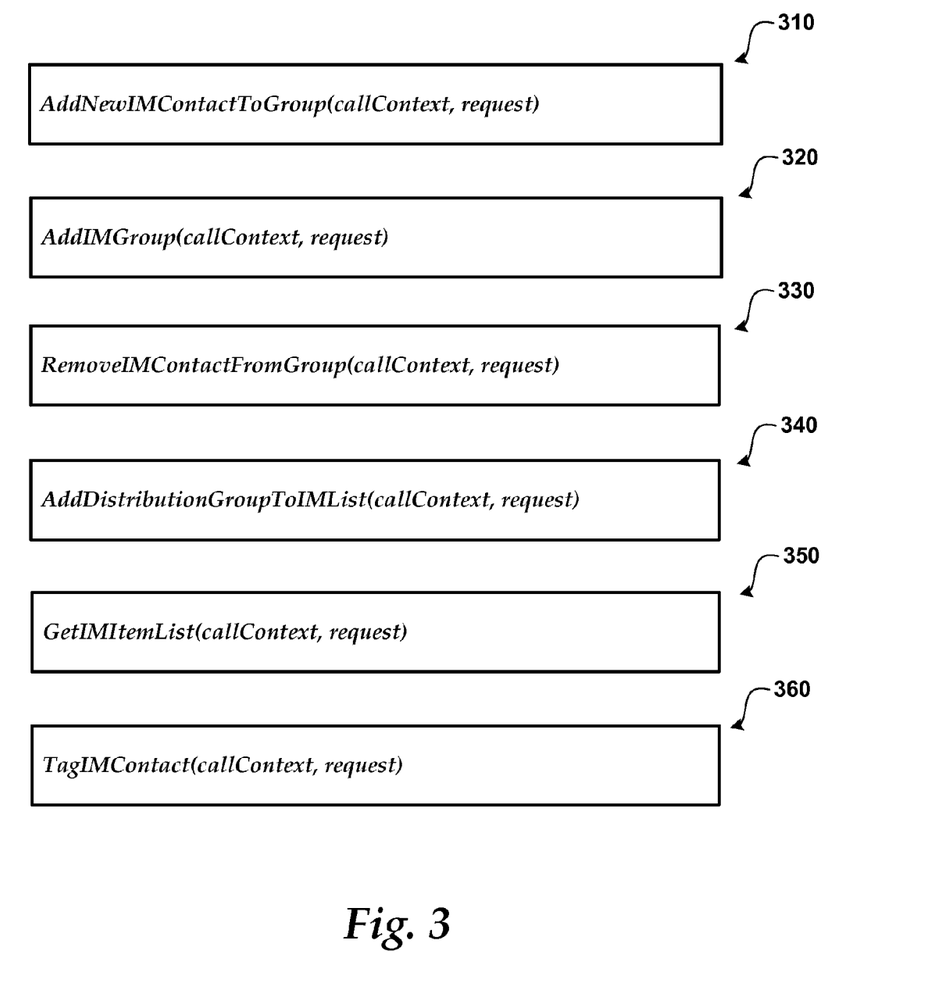
FIG. 3 shows exemplary API functions for interacting with contacts/lists stored in a unified contact store.

FIG. 3 shows exemplary API functions for interacting with contacts/lists stored in a unified contact store. As illustrated, API shows functions for adding a new IM contact to a group 310, adding a new IM group 320, removing an IM contact from a group 330, adding a distribution group to an IM list 340, getting an IM item list 350, and tagging an IM contact 360.

According to an embodiment, the APIs follow the format provided below.

```
AddNewImContactToGroup :
    /// <summary>
    /// Initializes a new instance of the
AddImContactToGroupCommand
    /// </summary>
    /// <param name="callContext">Information about the current call,
such as user identity, preferred culture, etc...</param> - THIS IS AN
AUTHENTICATED USER - here is my stuff - no state being
maintained - here I am again here is my stuff
    /// <param name="request">Request</param>
    public AddNewImContactToGroupCommand(CallContext
callContext, AddNewImContactToGroupRequest request)
        : base(callContext, request)
    /// <summary>
    /// Adds the new im contact to the group.
    /// </summary>
    /// <returns>ServiceResults</returns>
    internal override ServiceResult<Persona> Execute( )
AddImGroup:
    /// <summary>
    /// Initializes a new instance of the
AddImContactToGroupCommand
    /// </summary>
    /// <param name="callContext">Information about the current call,
such as user identity, preferred culture, etc...</param>
    /// <param name="request">Request</param>
    public AddImGroupCommand(CallContext callContext,
AddImGroupRequest request)
        : base(callContext, request)
    /// <summary>
    /// Adds the new im group.
    /// </summary>
    /// <returns>ServiceResults</returns>
    internal override ServiceResult<ImGroup> Execute( )
RemoveImContactFromGroup:
    /// <summary>
    /// Initializes a new instance of the
RemoveImContactFromGroupCommand class
    /// </summary>
    /// <param name="callContext">Information about the current call,
such as user identity, preferred culture, etc...</param>
    /// <param name="request">Request</param>
    public RemoveImContactFromGroupCommand(CallContext
callContext, RemoveImContactFromGroupRequest request)
        : base(callContext, request)
    /// <summary>
    /// Add the im contact to the group.
    /// </summary>
    /// <returns>ServiceResults</returns>
    internal override ServiceResult<ServiceResultNone> Execute( )
AddDistributionGroupToImList:
    /// <summary>
    /// Initializes a new instance of the
AddImContactToGroupCommand
    /// </summary>
    /// <param name="callContext">Information about the current call,
such as user identity, preferred culture, etc...</param>
    /// <param name="request">Request</param>
    public AddDistributionGroupToImListCommand(CallContext
callContext, AddDistributionGroupToImListRequest request)
        : base(callContext, request)
    /// <summary>
    /// Add the distribution group to the im list.
    /// </summary>
    /// <returns>ServiceResults</returns>
    internal override ServiceResult<ImGroup> Execute( )
```

-continued

```
GetImItemList:
    /// <summary>
    /// Initializes a new instance of the GetImItemListCommand class.
    /// </summary>
    /// <param name="callContext">Information about the current call, such
as user identity, preferred culture, etc...</param>
    /// <param name="request">Request</param>
    public GetImItemListCommand(CallContext callContext,
GetImItemListRequest request)
        : base(callContext, request)
    /// <summary>
    /// Gets the im item list.
    /// </summary>
    /// <returns>ServiceResults</returns>
    internal override ServiceResult<ImItemList> Execute( )
TagImContact:
    /// <summary>
    /// Initializes a new instance of the TagImContactCommand class.
    /// </summary>
    /// <param name="callContext">Information about the current call,
such as user identity, preferred culture, etc...</param>
    /// <param name="request">Request</param>
    public TagImContactCommand(CallContext callContext,
TagImContactRequest request)
        : base(callContext, request)
    /// <summary>
    /// Returns the response
    /// </summary>
    /// <returns>Returns the response</returns>
    internal override IExchangeWebMethodResponse GetResponse( )
wherein the parameters to the API set above follow:
    /// <summary>
    /// Implements the AddNewImContactToGroupRequestType schema
type.
    /// </summary>
    [XmlType("AddNewImContactToGroupRequestType", Namespace =
XmlNamespaces.MessageNamespace)]
    [DataContract(Namespace = JsonNamespaces.Exchange)]
    public class AddNewImContactToGroupRequest : BaseRequest
    {
        /// <summary>
        /// The Im Address of the Im Contact to add to a group.
        /// </summary>
        [XmlElement(ElementName = "ImAddress")]
        [DataMember(Name = "ImAddress", IsRequired = true, Order = 1)]
        public string ImAddress { get; set; }
        /// <summary>
        /// The display name of the Im Contact to add to a group.
        /// </summary>
        [XmlElement(ElementName = "DisplayName")]
        [DataMember(Name = "DisplayName", IsRequired = false, Order =
2)]
        public string DisplayName { get; set; }
        /// <summary>
        /// The group id of the group to add the Im contact to.
        /// </summary>
        [XmlElement(ElementName = "GroupId")]
        [DataMember(Name = "GroupId", IsRequired = false, Order = 3)]
        public ItemId GroupId { get; set; }
        /// <summary>
        /// Implements the AddImGroupRequestType schema type.
        /// </summary>
        [XmlType("AddImGroupRequestType", Namespace =
XmlNamespaces.MessageNamespace)]
    [DataContract(Namespace = JsonNamespaces.Exchange)]
    public class AddImGroupRequest : BaseRequest
    {
        /// <summary>
        /// The display name of the Im Group to add.
        /// </summary>
        [XmlElement(ElementName = "DisplayName")]
        [DataMember(Name = "DisplayName", IsRequired = true, Order =
1)]
        public string DisplayName { get; set; }
        /// <summary>
        /// Implements the RemoveImContactFromGroupRequestType
schema type.
        /// </summary>
```

-continued

```
[XmlType("RemoveImContactFromGroupRequestType", Namespace
= XmlNamespaces.MessageNamespace)]
    [DataContract(Namespace = JsonNamespaces.Exchange)]
    public class RemoveImContactFromGroupRequest : BaseRequest
    {
        /// <summary>
        /// The contact id of the Im contact to remove from a group.
        /// </summary>
        [XmlElement(ElementName = "ContactId")]
        [DataMember(Name = "ContactId", IsRequired = true, Order = 1)]
        public ItemId ContactId { get; set; }
        /// <summary>
        /// The group id of the group to remove the Im contact from.
        /// </summary>
        [XmlElement(ElementName = "GroupId")]
        [DataMember(Name = "GroupId", IsRequired = true, Order = 2)]
        public ItemId GroupId { get; set; }
        /// <summary>
        /// Implements the AddDistributionGroupToImListRequestType
schema type.
        /// </summary>
        [XmlType("AddDistributionGroupToImListRequestType",
Namespace = XmlNamespaces.MessageNamespace)]
    [DataContract(Namespace = JsonNamespaces.Exchange)]
    public class AddDistributionGroupToImListRequest : BaseRequest
    {
        /// <summary>
        /// The Smtp Address of the distribution group.
        /// </summary>
        [XmlElement(ElementName = "SmtpAddress")]
        [DataMember(Name = "SmtpAddress", IsRequired = true, Order =
1)]
        public string SmtpAddress { get; set; }
        /// <summary>
        /// Impelements the GetImItemListRequestType schema type.
        /// </summary>
        [XmlType("GetImItemListRequestType", Namespace =
XmlNamespaces.MessageNamespace)]
    [DataContract(Namespace = JsonNamespaces.Exchange)]
    public class GetImItemListRequest : BaseRequest
    {
        [XmlArray]
        [XmlArrayItem("ExtendedProperty", typeof(ExtendedPropertyUri),
Namespace = XmlNamespaces.TypeNamespace, IsNullable = false)]
        [DataMember(Name = "ExtendedProperties", IsRequired = false,
Order = 1)]
        public ExtendedPropertyUri[ ] ExtendedProperties;
        /// <summary>
        /// Implements the TagImContactRequestType schema type.
        /// </summary>
        [XmlType("TagImContactRequestType", Namespace =
XmlNamespaces.MessageNamespace)]
    [DataContraft(Namespace = JsonNamespaces.Exchange)]
    public class TagImContactRequest : BaseRequest
    {
        /// <summary>
        /// The contact id of the Im contact to tag.
        /// </summary>
        [XmlElement(ElementName = "ContactId")]
        [DataMember(Name = "ContactId", IsRequired = true, Order = 1)]
        public ItemId ContactId { get; set; }
```

Figure 4:
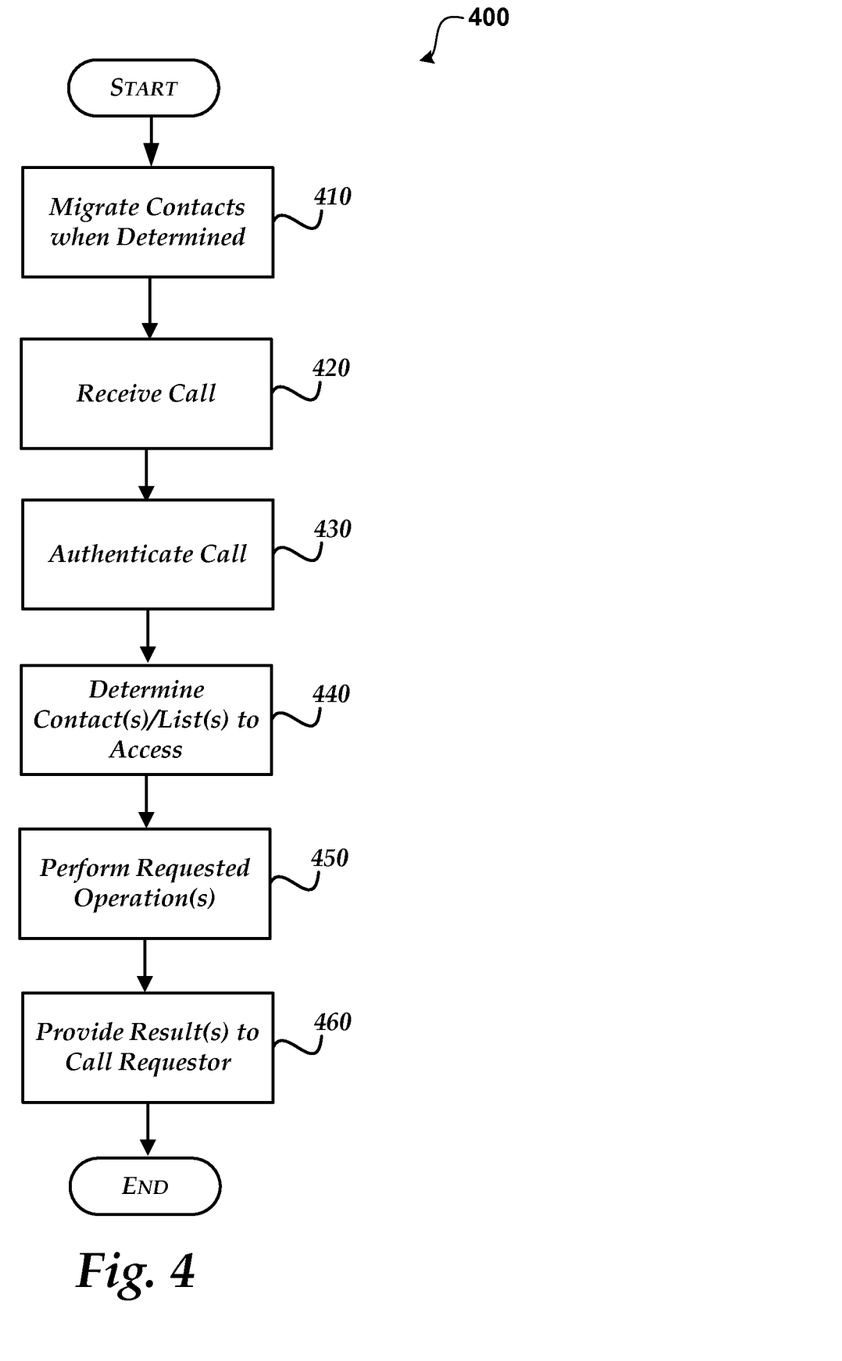
FIG. 4 shows an illustrative process for using an API for interacting with a unified contact store at a primary contact service from a different service

FIG. 4 shows an illustrative process for using an API for interacting with a unified contact store at a primary contact service from a different service. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof After a start operation, the process 400 flows to operation 410, where contacts are migrated from the different service/client application to the primary contact service when determined According to an embodiment, the contacts are IM contact lists that are migrated from a unified communications service to a messaging service. The contacts are migrated to the primary contact service when the contacts at the different service do not exist at the primary contact service. The contacts may be migrated using the API. Once the contacts are migrated from the different service to the primary contact service, the contacts are maintained by the primary contact service and accessed/manipulated using the API.

Moving to operation 420, a call using the API is received by the primary contact service. The call may be made by a client application of a service (e.g. a client of the different service that is different from the primary contact service) and/or from a service itself (e.g. the different service). The API includes functions such as, but not limited to: adding a new IM contact to a group, adding a new IM group, removing an IM contact from a group, adding a distribution group to an IM list, getting an IM item list, and tagging an IM contact. According to an embodiment, each call to the API typically receives a context parameter and a request parameter. The context parameter is used for authentication and the request parameter is used to provide the information used to request the action to be performed regarding the identified contact(s)/list(s).

Flowing to operation 430, the call using the API is authenticated by the primary contact service. The call is authenticated to help ensure that the requestor is authorized to perform the requested operation regarding the contacts/lists through the API. The context parameter may include a variety of different information, including but not limited to: information about the requestor of the current call, such as user identity, preferred culture, identification of a mailbox, security information (e.g. token/certificate) and the like. According to an embodiment, each API call is stateless. In other words, each API call can be processed and authenticated independently of other calls.

Transitioning to operation 440, a determination is made as to what contact(s)/list(s) are affected by the call. For example, when adding a contact to a group, a group is affected. Generally, one or more contacts/lists within the primary contact service may be added/deleted/changed/queried in response to a call.

Moving to operation 450, the requested operation is performed. For example, an IM contact is added/deleted to/from group, a group of contacts is added/deleted, a new group is added/deleted, an IM contact is added/deleted, a distribution group is added to an IM list, an IM item list is retrieved, an IM contact is tagged and the like.

Flowing to operation 460, the result(s) are provided to the call requestor.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   determining when to migrate contacts to a primary contact service from a different service;
   in response to migrating contacts to the primary contact service, removing the contacts from the different service;
   receiving a call at the primary contact service from the different service through an Application Programming Interface (API) that includes functions for interacting with the contacts at the primary contact service, wherein the different service comprises a plurality of tenants subscribing to the different service;
   in response to the call, determining a request parameter and a context parameter that is associated with the call that specifies authentication information that is used to authenticate a user and associate the user with the primary contact service;
   performing an operation at the primary contact service as determined by the call that affects at least one contact that is stored with the primary service and used by the different service; and
   providing results of the operation performed at the primary contact service to the different service in response to the call.

2. The method of claim 1, wherein the functions further comprise at least two of a function to add a new Instant Message (IM) contact to a group, a function to add a new IM group, a function to remove an IM contact from a group, a function to add a distribution group to an IM list, a function to get an IM item list, and a function to tag an IM contact.

3. The method of claim 1, further comprising parsing the call to determine the context parameter.

4. The method of claim 1, further comprising storing a cached copy of a contact list at the different service.

5. The method of claim 1, further comprising adding a new Instant Message (IM) contact to a group using the call that includes the context parameter and the request parameter that specifies an IM contact to add to a group that is stored with the primary contact service.

6. The method of claim 1, further comprising removing an Instant Message (IM) contact from a group using the call that includes the context parameter and the request parameter that specifies an IM contact to remove from a group that is stored with the primary contact service.

7. The method of claim 1, further comprising adding a distribution group to an Instant Message (IM) list using the call that includes the context parameter and the request parameter that specifies a distribution group to add to an IM list that is stored with the primary contact service.

8. The method of claim 1, further comprising getting an Instant Message (IM) item list using the call that includes the context parameter and the request parameter that specifies an item list to get from an IM item list that is stored with the primary contact service.

9. The method of claim 1, further comprising tagging an Instant Message (IM) contact using the call that includes the context parameter and the request parameter that specifies an IM contact to tag that is stored with the primary contact service.

10. A system comprising:
    a memory; and
    a processor operably coupled to the memory and configured to:
    determine when to migrate contacts to a primary contact service from a different service;
    in response to migrating contacts to the primary contact service, remove the contacts from the different service;
    receive a call at the primary contact service from the different service through an API that includes functions for interacting with contacts at the primary contact service, wherein the different service comprises a plurality of tenants subscribing to the different service;
    in response to the call, determine a request parameter and a context parameter that is associated with the call that specifies authentication information that is used to authenticate a user and associate the user with the primary contact service;
    perform an operation at the primary contact service as determined by the call that affects at least one contact that is stored with the primary service and used by the different service; and
    provide results of the operation performed at the primary contact service to the different service in response to the call.

11. The system of claim 10, further configured to use the functions comprising at least two of a function to add a new Instant Message (IM) contact to a group, a function to add a new IM group, a function to remove an IM contact from a group, a function to add a distribution group to an IM list, a function to get an IM item list, and a function to tag an IM contact.

12. The system of claim 10, further configured to add a new Instant Message (IM) contact to a group using the call that specifies an IM contact to add to a group that is stored with the primary contact service.

13. The system of claim 10, further configured to remove an Instant Message (IM) contact from a group using the call that specifies an IM contact to remove from a group that is stored with the primary contact service.

14. The system of claim 10, further configured to add a distribution group to an Instant Message (IM) list using the call that specifies a distribution group to add to an IM list that is stored with the primary contact service.

15. The system of claim 10, further configured to get an Instant Message (IM) item list using the call that specifies an item list to get from an IM item list that is stored with the primary contact service.

16. The system of claim 10, further configured to tag an Instant Message (IM) contact using the call that specifies an IM contact to tag that stored with the primary contact service.

17. A method comprising:
    determining when to migrate contacts to a primary contact service from a different service;
    in response to migrating contacts to the primary contact service, removing the contacts from the different service;
    sending a call to the primary contact service from the different service via an API that includes functions for interacting with the contacts at the primary contact service, wherein the different service comprises a plurality of tenants subscribing to the different service;
    in response to the call, providing a request parameter and a context parameter that is associated with the call that specifies authentication information that is used to authenticate and associate a user with the primary contact service;
    using the call to perform an operation that affects at least one contact that is stored with the primary service and used by the different service; and receiving results of the operation performed at the primary contact service from the primary contact service for the different service in response to the call.

18. The method of claim 17, further comprising using the functions that include a plurality of: a function to add a new Instant Message (IM) contact to a group, a function to add a new IM group, a function to remove an IM contact from a group, a function to add a distribution group to an IM list, a function to get an IM item list, and a function to tag an IM contact.

\* \* \* \* \*